UNITED STATES PATENT OFFICE.

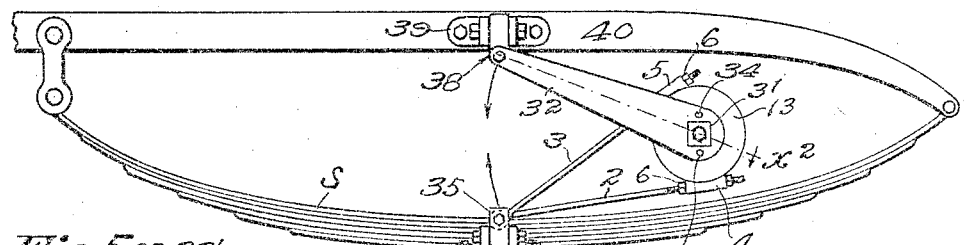
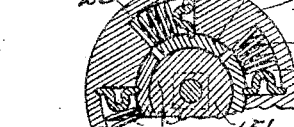
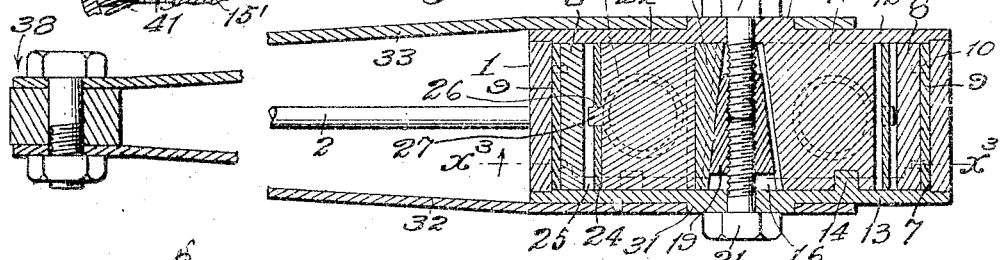
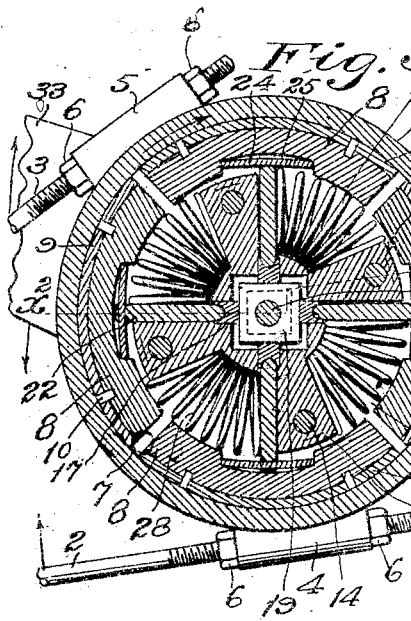
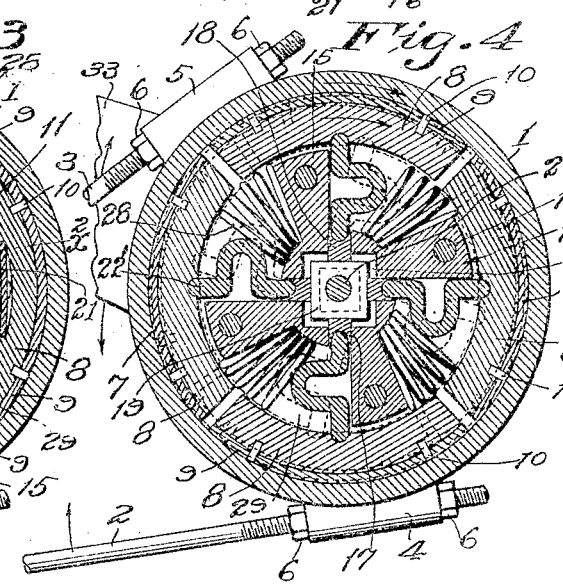

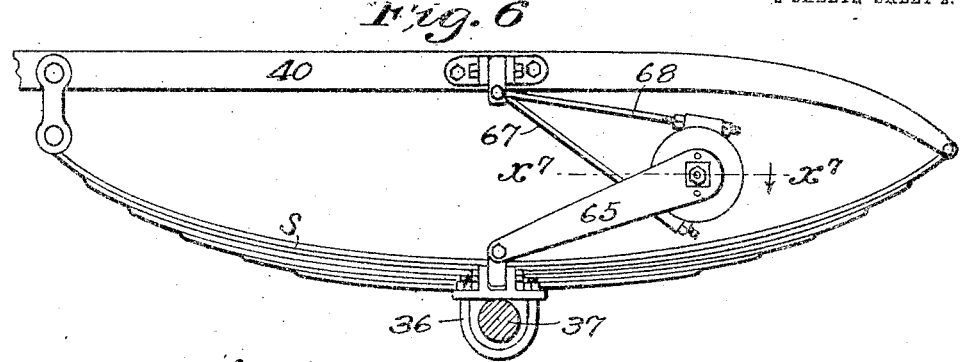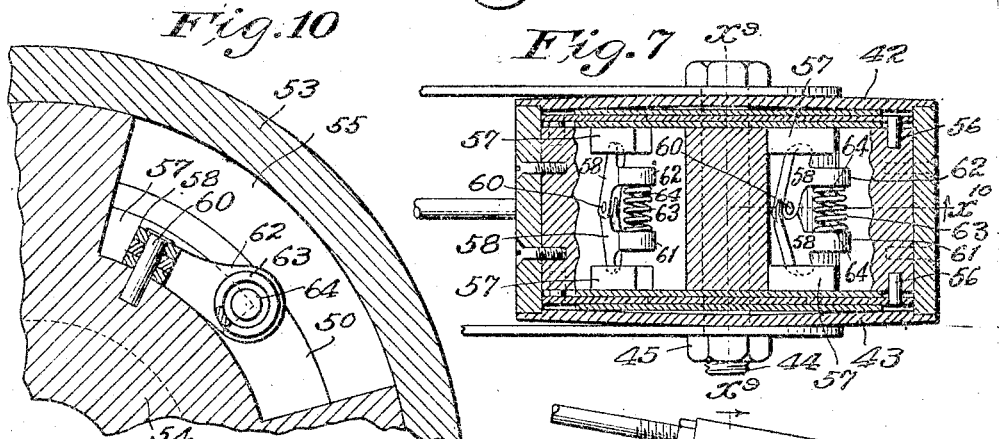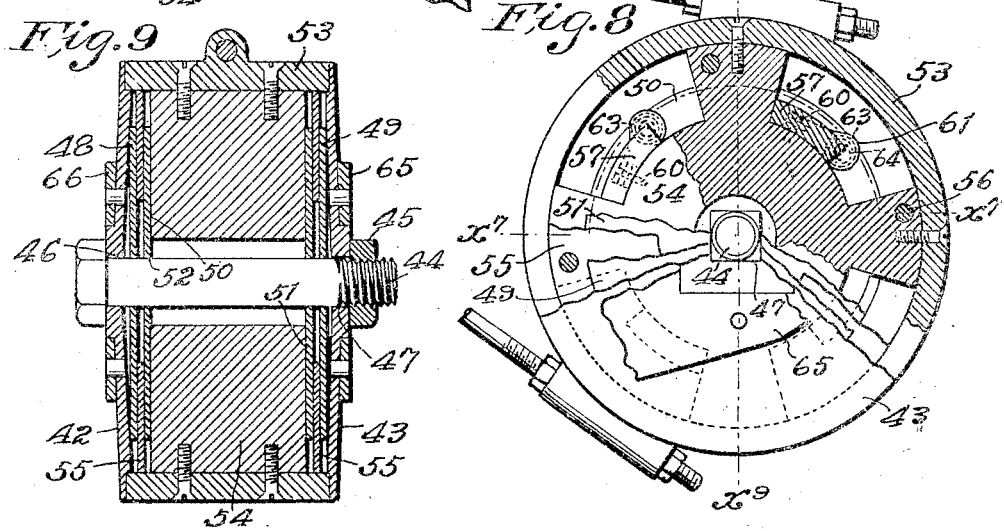

GEORGE CUSHING MARTIN, OF LOS ANGELES, CALIFORNIA.

SHOCK-ABSORBER.

993,536.  Specification of Letters Patent.  Patented May 30, 1911.

Application filed November 4, 1909. Serial No. 526,260.

*To all whom it may concern:*

Be it known that I, GEORGE CUSHING MARTIN, a citizen of the United States, residing at Los Angeles, in the county of Los Angeles and State of California, have invented a new and useful Shock-Absorber, of which the following is a specification.

This invention relates to that class of shock absorbers in which mechanism is arranged to allow relatively movable bodies as a vehicle frame and vehicle axle to move toward each other readily with comparatively slight resistance and from each other slowly against comparatively great resistance so that when a vehicle goes over an irregularity on the road the axles move readily upward to compress the springs toward the vehicle frame, whereupon the mechanism of the shock absorber becomes operative to hold the axle and frame from speedily separating so that the tension of the springs can only be relieved slowly owing to the resistance of the shock absorber, thus avoiding all tendency of the vehicle springs to toss the vehicle body.

Shock absorbers capable of effective use on automobiles are required to stand frequent and great strains and it is desirable that they shall be as compact and light as possible. This shock absorber relates to that class of shock absorbers in which pressure is exerted outwardly against an annular rim and in this invention a floating segmental shoe having an external surface conforming to the internal surface of the annular rim is employed and the contact of said shoe with said rim is effected by a toggle bar interposed between a central support and the shoe; said bar being capable of action as a member of a toggle joint, and sufficient resiliency being provided for between the central support and the shoe to allow a determinate movement of the toggle bar after effective clutching friction has occurred between the shoe and the rim.

The demands upon the clutch of the shock absorber are not only forceful but are of rapid occurrence and the movements to effect and to release the frictional grip are extremely minute, and for this reason any slight wear or other effect tending to distort the rim is rapidly multiplied until the shock absorber becomes inoperative, and an object of this invention is to prevent any such distortion of the rim and to avoid the necessity of frequent adjustments to take up the wear, and also to provide practical means for taking up any wear which may occur.

It is essential in constructing a shock absorber to provide means which will not absolutely prevent the return of the spring, but which will permit the spring to return gently and at the same time surely to its normal position, after it has been depressed under the vehicle body. Where this is accomplished by means of friction the friction must be applied with a considerable degree of resiliency; otherwise the tendency is either to prevent the spring from recovering its normal position or to permit the spring to recoil with a snap. Where the friction is applied through non-resilient means it may be assumed that an adjustment may be made which will accomplish the desired result for a single recoil or throw of the spring. It must be obvious, however, that each action of the spring, unless the friction effecting means is resilient in its nature, will, through wear, reduce the friction and in a short time render it ineffective to sufficiently retard the tendency of the vehicle spring to recoil with uncomfortable vigor. Where the friction is applied in a resilient manner as used in this invention the resiliency adapts itself to the wear and makes it unnecessary to secure a too delicate adjustment, and causes the requisite adjustment to remain effective for a considerable period.

The object of this invention is to provide neat, simple, strong, cheap, easily constructed and easily applied means by which resistance in one direction and freedom of movement in the other direction is attained in the most practical manner.

The invention may be carried out in various ways.

The accompanying drawings illustrate the invention in some of the forms in which it may be embodied.

Figure 1 is a side elevation of a shock absorber embodying this invention and applied to a vehicle, a fragment of which is shown. Fig. 2 is a section on line $x^2$, Fig. 1, looking in the direction of the arrow. Fig. 3 is a section on line $x^3$, Fig. 2 looking in the direction of the arrow. Fig. 4 is a section of a shock absorber embodying the invention in a form different from that shown in Figs. 2 and 3. Fig. 5 is a sectional view of a shock absorber provided with shoes arranged to move inwardly to apply the braking friction. Fig. 6 is a side elevation of a shock absorber embodying the invention in another form as the same appears when connected with a vehicle, fragments of which are shown. Fig. 7 is a section on line $x^7$, Fig. 6 looking downward in the direction of the arrow. Fig. 8 is a fragmental side elevation looking at Fig. 7 from below. The nut is omitted, portions are broken away and other portions are sectioned to illustrate internal construction. Fig. 9 is a section on line $x^9$, Figs. 7 and 8. Fig. 10 is a section on line $x^{10}$, Fig. 7 on enlarged scale.

The invention comprises two relatively rotatable members each of which may be constructed of one or more parts; a shoe, and resilient toggle means operatable by relative rotation of said members to cause the shoe to frictionally engage one or the other of said members to offer high resistance to such relative rotation of the members in one direction and to relieve such resistance and allow comparatively free relative rotation in the other direction. The relatively rotatable members as constructed and arranged in this appliance are cylindrical and concentric in their nature and may be variously constructed.

Referring first to the form shown in Figs. 1, 2 and 3, and as further exemplified in Fig. 4, the outer member 1 is an annular shell or ring to which are fixed arms 2, 3, by means of eyes 4, 5, through which the arms 2, 3, are passed, the same being secured by nuts 6 screwed on the ends of said arms that are threaded for that purpose. In Figs. 1, 2, 3, 4 the shell is provided internally with a smooth frictional face 7 against which the floating segmental shoes 8 having fiber faces 9 fastened by studs, pins or rivets 10, are arranged to frictionally engage said shoes conforming externally with the annular frictional face 7. The number of shoes may be varied according to the work required. Preferably shoes are arranged in opposition to each other around the axis of rotation so that the pressure is equalized around such axis. In Figs. 3 and 4 there are four shoes and said shoes are movable radially within the shell or ring 1 and unitedly constitute an expansible cylinder to fit the internal cylindrical face of the ring.

The member which is rotatable relative to the ring 1 in Figs 1, 2, 3, and 4, comprises a hollow body 11 which is fixed to two heads 12, 13, being cast integral with one of the heads 12, and fastened to the other head 13 by rivets 14, so that the two heads and the body must rotate together. The body 11 is externally recessed to form radial arms 15, and is provided internally with a chamber 16, the walls of which are provided with slots 17 to receive tapering slips 18 adapted to be engaged by a wedge 19 which is carried inside the chamber 16 by means of adjusting bolts 20 and 21, the heads of which are on the outside of the heads 12 and 13. The wedge 19 is preferably frusto-pyramidal and its faces engage the inner faces of the slips so that said wedge is non-rotatable within its chamber 16, and may serve to adjust the slips radially. The outer faces of the slips 18 are grooved to form seats or sockets for the inner edges or ends of toggle bars 22, which edges are preferably convex so that the toggle bars are pivotally connected with the slips.

The outer edges of the toggle-bars are arranged in pivotal relation to the brake shoes 8. The toggle joint includes a resilient member. In the form shown in Figs. 2 and 3, the resilient members of the toggle joints consist of leaf springs 24 that are seated in recesses 25 in the inner faces of the shoes 8. Said leaf springs are provided with perforations 26 to receive pins 27 that project from the outer edges of the toggle bars 22, so that a leaf spring 24 and a toggle bar 22 together form a resilient toggle device.

In the form shown in Figs. 4 and 5, another form of the resilient toggle device is shown, the toggle bars in these views being resilient bow-shaped plates 22' made preferably of spring steel. Resilient means are provided to force said toggle-joints into operable position. Said means, as shown in Figs. 3, 4 and 5, consist of coil springs 28 arranged in the recesses 29 in Figs. 3 and 4 and 29' in Fig. 5 between the radial arms 15, and in recesses 29. Said recesses accommodate the toggle bars and their operative springs.

The radial arms 15 constitute stops to prevent the toggle-bars from passing radial position so that when relative rotation occurs between the two members the maximum pressure of the shoe may be attained and when attained will be maintained until the actual relative rotation of the members in that direction has ceased. The stop is arranged to maintain the friction desired to retard the recoil action of the vehicle spring without preventing such recoil.

The wedge 19 may be adjusted to spread the slips 18 apart, thereby to increase the tension of the toggle device and thereby increase the pressure of the brake-shoes on the inner surface of the ring 1. This may be done by loosening the bolt 21 and tightening the bolt 20. A reverse operation will loosen the tension of the springs and consequently the friction of the shoes on the ring 1.

The heads 12 and 13 are provided with angular bosses 30 and 31 on which are fixed two side arms 32, 33, the same being held in place by screws 34. The arms 2, 3, are pivoted by a universal joint 35 to clip 36 fastened to the axle 37 of the vehicle, and the arms 32, 33, are pivoted by the universal joint 38 to bracket 39 fastened to the frame 40 of the vehicle which is supported by the springs.

In the form shown in Fig. 5, the shoes 8″ are arranged to engage a cylindrical body or core 41 that is fastened to heads, not shown, similar to the heads 12, 13 in Fig. 2. The springs 28 and resilient toggle bars 22′ correspond to the elements bearing the characters 28 and 22 in Fig. 4. Relative rotation of the ring 1″ and member 15′ in Fig. 5 results in applying the brake in one direction and releasing it in the other direction.

In any of the forms shown in Figs. 1, 2, 3, 4 and 5, when relative rotation occurs in one direction as indicated by the long arrows shown in Figs. 3 and 4, the shoes 8, travel with the rings 1 carrying the toggle-bars away from radial position as indicated by the dotted lines in Fig. 4, thus relieving the friction between the ring and shoes. Reverse movements of the parts restore the friction as the toggle bars approach radial position. The amount of friction is regulated in the forms shown in Figs. 3 and 4 by the adjusting of the wedge 19.

In Figs. 6, 7, 8, 9 and 10, the toggle joint is arranged to apply the pressure toward the heads 42 and 43, which are made of resilient material and are fastened together by a bolt and nut 44, 45. The bolt 44 is angular in cross-section and fits the apertures 46, 47, in the heads 42, 43, so that said heads are held in non-rotative relation to each other. Friction disks 48, 49, 50 and 51 are provided with like annular orifices 52 to fit the bolt so that said disks, said head and said bolt practically form a single member which rotates relative to the other member which is composed of the ring 53, an internal body 54, a friction disk 55 fixed thereto by pins 56 and a toggle joint mechanism comprising shoes 57, toggle bars 58 pivoted together by a pivot 60 and provided with arms 61, 62, pressed apart by a coil spring 63 to hold the toggle joint in operable position. The pivots 60 extend through the hinges of the toggle-joints into the body 54 so that the toggle-bars 58 are carried by said body and rotated therewith, while the shoes 57 are in frictional engagement with the oppositely-arranged internal friction disks 50 and 51 and consequently will tend to rotate with the angular bolt 44 and the heads 42, 43. The friction disks 48 and 50 are practically a unit and the same is true of friction disks 49 and 51. The purpose of making two disks and interposing between them the friction disk 55 which is fixed to the internal body 54 is simply to increase the frictional surface between, and consequently the resistance to relative rotation of the two relatively rotatable members when the toggle-joints are operated to force the shoes 57 away from each other, the principle of the operation being that when the body 54 and the element comprising the heads 42, 43, and bolt and nut 44 and 45 are relatively rotated in one direction the pivot 60 of the toggle-joint operates to move the hinge of said joint toward the coil springs 63, the tendency of the shoes 57 being to move the ends of the toggle-bars in the opposite direction, this tendency being also accentuated by the springs 63 which are held in place between the arms 61 and 62 by studs 64 projecting from said arms. Thus rotation in one direction causes increased resistance to such rotation and rotation in the other direction relieves the pressure and the resistance. The arms 65, 66, and the arms 67, 68, in Fig. 6, correspond to the arms 32, 33, in Fig. 1.

By employing floating shoes 8 that are free to move both circumferentially and radially, the curved outer faces of the shoes may at all times fit the frictional face 7 without any tendency to gouge, indent, distort or unequally wear the same, and consequently the wear which occurs between said faces is practically negligible, being ordinarily taken up by the resilient elements of the toggle-joint, and when the wear becomes noticeable it is taken up by adjusting the wedge, the object being to provide a clutching mechanism which will almost instantaneously exert its maximum clutching effect in sufficient degree to permit a relative rotation of the parts when actuated by sufficient force and at the same time and in connection therewith the radial arms 15 provide stops which will prevent the toggle joint from passing beyond radial position.

I claim:—

1. Two relatively rotatable members, a floating shoe between said members and frictionally engaging one of said members, and resilient means including a toggle joint and arranged between the shoe and the other member, and operatable by relative rotation of said members to force the shoe with yielding pressure against the member with which the shoe engages.

2. Two relatively rotatable members, radially movable shoes, and resilient toggle means operatable by relative rotation of said members to move said shoes radially to frictionally engage one of said members.

3. Two relatively rotatable members, a shoe between said members and a toggle joint between the shoe and one of said members, said shoe being adapted to frictionally engage one of said members and said toggle joint being resilient and operatable by the other of said members to press the shoe against the first member when said members are relatively rotated in one direction and to release the pressure when the members are relatively rotated in the other direction.

4. Two relatively rotatable members, shoes between said members and resilient toggle joints between the shoes and one of said members, said shoes being adapted to frictionally engage one of said members, and said toggle joints being operatable by the other of said members to press the shoes against the first member when said members are relatively rotated in one direction and to release the pressure when the members are relatively rotated in the other direction.

5. Two relatively rotatable members, shoes between said members and arranged to engage one of said members and oppositely arranged resilient toggle joints between the members, said joints being operatable by relative rotation of the members to cause resistance to relative rotation of said members in one direction.

6. Two relatively rotatable members, shoes between said members and arranged to engage one of said members, oppositely arranged resilient toggle joints between the members, said joints being operatable by relative rotation of the members to cause resistance to relative rotation of said members in one direction, and spring means to hold the toggle joints yieldingly in pressure applying position.

7. A shock absorber comprising a ring, a body in rotatable relation with the ring, shoes between the body and the ring, resilient toggle bars between the shoes and the body, and springs tending to hold the toggle bars in radial positions to move said shoes radially.

8. In a shock absorber the combination with one element, of a second element, said elements being relatively rotatable, a shoe in frictional engagement with one of the elements, resilient toggle means between the shoe and the second element and operatable by the relative rotation of the elements and the friction of the shoe on the second element to advance toward and recede from radial position, and a stop to prevent the toggle-means from advancing beyond radial position.

9. A shock absorber comprising two relatively rotatable members, a floating shoe, resilient means operatable by the relative rotation of said members to force the shoe into engagement with one of said members and means to adjust said operatable means to increase or decrease the force with which said shoe is operated.

10. In a shock absorber, two relatively rotatable members, radially movable shoes, radially adjustable resilient means operatable by relative rotation of said members to move said shoes radially to frictionally engage one of said members, and means to adjust the tension of said radially adjustable means.

11. In a shock absorber, two relatively rotatable members, shoes between said members, resilient toggle-joints between the shoes and one of said members; said shoes being conformed to the face of one of said members, said toggle-joints being operatable by the other of said members to press the shoes against said face when said members are relatively rotated in one direction and to release the pressure when the members are relatively rotated in the other direction; and means to adjust the tension of said toggle joints to increase the pressure.

12. In a shock absorber, two relatively rotatable members, floating shoes between said members, resilient means operatable by a relative rotation of said members to force the shoes into frictional engagement with one of said members upon relative rotation of the members in one direction, and to relieve such engagement upon relative rotation in the other direction; a wedge and means to operate the wedge to force the toggle-joint outward radially.

13. In a shock absorber, two relatively rotatable members, floating shoes between said members, resilient means operatable by a relative rotation of said members to force the shoes into frictional engagement with one of said members upon relative rotation of the members in one direction, and to relieve such engagement upon relative rotation in the other direction, wedging means, and means to move the wedging means axially relative to said members to force the toggle-bars radially outward.

14. The combination with a vehicle axle and a vehicle frame of two concentric members connected with the frame and axle respectively, a floating shoe between the members, a resilient toggle-bar between the shoe and one of said members and springs between the toggle bar and one of said members to limit the deflection of the toggle-bar.

15. In a shock absorber the combination of two members, a shoe between the members, and means effecting resilient articulation of the shoe with one of the said members and comprising a resilient toggle-bar and a spring.

16. A shock absorber comprising two relatively rotatable members and means frictionally and resiliently connecting said two members, said connection comprising a toggle-joint and a brake shoe.

In testimony whereof, I have hereunto set my hand at Los Angeles, California, this 29th day of October, 1909.

GEO. CUSHING MARTIN.

In presence of—
JAMES R. TOWNSEND,
L. BELLE RICE.